(12) United States Patent
Funaki et al.

(10) Patent No.: US 8,900,721 B2
(45) Date of Patent: Dec. 2, 2014

(54) BRONZE ALLOY, PROCESS FOR PRODUCING THE SAME, AND SLIDING MEMBER COMPRISING BRONZE ALLOY

(75) Inventors: Katsuyuki Funaki, Kanazawa (JP); Takeshi Kobayashi, Toyonaka (JP); Toru Maruyama, Suita (JP); Toshimitu Okane, Tokyo (JP); Iwao Akashi, Tokyo (JP)

(73) Assignees: Akashi Gohdoh Inc., Hakusan-Shi (JP); Katsuyuki Funaki, Kanazawa-Shi (JP)

( * ) Notice: Subject to any disclaimer, the term of this patent is extended or adjusted under 35 U.S.C. 154(b) by 431 days.

(21) Appl. No.: 12/736,484

(22) PCT Filed: Nov. 14, 2008

(86) PCT No.: PCT/JP2008/070755
§ 371 (c)(1),
(2), (4) Date: Oct. 13, 2010

(87) PCT Pub. No.: WO2009/136457
PCT Pub. Date: Nov. 12, 2009

(65) Prior Publication Data
US 2011/0027612 A1     Feb. 3, 2011

(30) Foreign Application Priority Data

May 9, 2008   (JP) ................................. 2008-123887
Jun. 30, 2008  (JP) ................................. 2008-171776
Oct. 17, 2008  (JP) ................................. 2008-268822

(51) Int. Cl.
| | |
|---|---|
| B32B 15/00 | (2006.01) |
| C22C 9/02 | (2006.01) |
| C22C 1/02 | (2006.01) |
| C22C 1/10 | (2006.01) |
| F16C 33/12 | (2006.01) |

(52) U.S. Cl.
CPC ... *C22C 9/02* (2013.01); *C22C 1/02* (2013.01); *C22C 1/1036* (2013.01); *F16C 33/121* (2013.01); *Y02T 10/865* (2013.01); *F16C 2204/12* (2013.01)
USPC ........... 428/677; 420/470; 420/473; 420/481; 420/485

(58) Field of Classification Search
None
See application file for complete search history.

(56) References Cited

U.S. PATENT DOCUMENTS

| | | | | | |
|---|---|---|---|---|---|
| 2,038,136 | A | * | 4/1936 | Smith | 420/477 |
| 4,336,082 | A | * | 6/1982 | Kimura | 148/433 |
| 4,786,469 | A | * | 11/1988 | Weber et al. | 420/469 |
| 5,198,044 | A | * | 3/1993 | Colijn et al. | 148/514 |
| 5,230,757 | A | * | 7/1993 | Rundman et al. | 148/539 |
| 5,266,099 | A | * | 11/1993 | Kelley | 75/337 |
| 5,487,867 | A | * | 1/1996 | Singh | 420/471 |
| 6,602,615 | B2 | | 8/2003 | Sakai et al. | |

(Continued)

FOREIGN PATENT DOCUMENTS

| | | |
|---|---|---|
| JP | H11-293305 A | 10/1999 |
| JP | 2005-60808 A | 3/2005 |

(Continued)

*Primary Examiner* — Mark Ruthkosky
*Assistant Examiner* — Daniel J Schleis
(74) *Attorney, Agent, or Firm* — Manabu Kanesaka (57) ABSTRACT

A bronze alloy includes copper, tin, bismuth, nickel and sulfur and a metal structure of the bronze alloy has an eutectoid phase including α-copper having a lamellar structure including a flaky copper-tin intermetallic compound precipitated and metal particles including the bismuth dispersedly precipitated therein.

3 Claims, 7 Drawing Sheets

(56) References Cited

U.S. PATENT DOCUMENTS

| | | |
|---|---|---|
| 6,652,675 B2 | 11/2003 | Sakai et al. |
| 2004/0094243 A1* | 5/2004 | Wynne et al. ................. 148/433 |
| 2004/0149083 A1* | 8/2004 | Takayama et al. ............... 75/232 |
| 2008/0173550 A1* | 7/2008 | Kiso et al. ..................... 205/253 |
| 2010/0002968 A1* | 1/2010 | Mergen ........................ 384/129 |
| 2010/0227188 A1* | 9/2010 | Takayama .................... 428/565 |
| 2011/0091738 A1* | 4/2011 | Tachibana et al. ............ 428/601 |

FOREIGN PATENT DOCUMENTS

| | | |
|---|---|---|
| JP | 2007-297675 | 11/2007 |
| JP | 2008-50688 A | 3/2008 |
| WO | 94/24324 * | 10/1994 |
| WO | WO 2007/126006 A1 | 11/2007 |

\* cited by examiner

Figure 1

- α'
- Primary Crystal of α
- $Cu_2S$
- Untransformed γ

Figure 2

- Untransformed γ

Prior Art

Figure 5
Prior Art

Load

BRONZE ALLOY, PROCESS FOR PRODUCING THE SAME, AND SLIDING MEMBER COMPRISING BRONZE ALLOY

TECHNICAL FIELD

The Present invention relates to a low-lead or lead-free new bronze alloy with superior abrasion resistance and its production method thereof, and a sliding member using the same.

BACKGROUND ART

Because of a recent tendency to pursue size-reduction, speed-up and high-pressure in hydraulic machinery, such equipments including a cylinder block of a motor or of a hydraulic pump or motor, an under body, and a variable speed shaft bearing tend to be used under harsh conditions. For example, the volume of incidental facilities, such as a catalyst, tend to take more space in the motor chamber of axial piston hydraulic pumps and motors, used for power shovels and other such machines in construction machinery, in order to comply with the emission regulations that get stricter every year. As a result, the size of hydraulic pumps has to be reduced. However, to demand the same level of discharge rate as before from the hydraulic pumps with reduced-size will require their use under higher pressure of more than 450 bars and higher speed of more than 3,000 rpm.

In such circumstances, a sliding member that is subject to high pressure, such as the cylinder block of the hydraulic pump, is required to maintain stable sliding capacity even under the aforementioned harsh conditions. In order to obtain such stable sliding capacity under the harsh conditions, the combination of a steel piston and a cylinder block using copper alloy as its sliding material is essential. A composite material in which a layer of copper alloy is solidly deposited on steel has also been developed for such sliding member.

However, since the sliding member subjected to high pressure, such as the cylinder block of the hydraulic pump described above, is also required of high seizing resistance, lead bronze that contains about 10 mass % of lead (Pb) is mainly used for the aforementioned copper alloy. The lead contained in the copper alloy has small affinity for both steel and copper alloy, and is an indispensable element instrumental in obtaining high seizing resistance as well as high abrasion resistance. In the case where the lead content in the aforementioned lead bronze is lowered, its seizing resistance ability is also reduced, thus making it inadequate as a material for the sliding member of hydraulic equipments that tend to be used under harsh conditions.

On the other hand, from the standpoint of environmental conservation, the efforts to reduce lead content in copper alloy to make it low lead or lead-free are gaining ground. In recent years, there is a move to prohibit or decrease the use of environmental load substances, such as lead and cadmium, in various industrial products. Thus, for example, in order to comply with the European environmental regulations, lead content in copper-tin alloy has to be reduced to 4 mass % or less.

In response to such a move, various efforts have been taken toward the reduction of lead content in copper alloy for the sliding member, and a variety of sliding materials to achieve the reduction of lead content, with higher sliding capability, have been suggested. For example, a copper-based or iron-based sliding material with more than 1 variety of bismuth (Bi)-based intermetallic compounds are dispersedly precipitated therein is disclosed in JP h11-293305. This sliding material is claimed to have achieved lead-free and higher seizing resistance by means of solid lubrication effect deriving from bismuth-based intermetallic compounds.

In JP 2002-285262, a copper-based multi-layered sliding material including a steel plate and sintered copper alloy bonded thereto is disclosed. The composition of the above sintered copper alloy is tin (Sn):1.5 to 15 mass %, Bi: 1.5 to 15 mass %, solid lubricant: 1.5 to 20% by volume, with remains Cu, while the volume ratio of Bi and solid lubricant is 0.5 to 2.0%. An invention described in JP 2002-285262 also offers a lead-free copper-based multilayered sliding material that has sliding capability higher than or equal to the lead bronze sintered alloy.

In WO 2007/126006 A1, a copper alloy for sliding material which is either solid solution hardened or solid solution strengthened by both solid solution and compound generation, containing 0.05 to 1.5 mass % sulfur (S) with an intermetallic formation of $Cu_2S$ compounds or $Cu_2S$ compounds+ZnS compounds, is disclosed. This copper alloy for sliding material, containing at least either 0.1 mass % or more and 11.0 mass % or less Pb, or 0.1 mass % or below 5.4 mass % Bi (these do not undergo solid solution in a copper matrix), where they are found alone or as PbS compound or $Bi_2S_3$ compound. The copper alloy described in this publication claimed to have enabled both abrasion resistance and seizing resistance at high level and achieved long life as a material for the sliding member even under harsh conditions by means of inclusion of appropriate amount of S.

Further, in JP 2007-297675, a lead-free casting copper alloy that contains S, Bi, Fe (and/or Ni) and has sulfide dispersed therein is disclosed. This invention disclosed in JP 2007-297675 relates to the casting lead-free copper alloy for a material for water faucet clasps, wetted stopper and the like. This invention realizes superior machinability and pressure resistance without containing lead that can cause harm to human body, while preventing an occurrence of a cavity inside a casting as sulfide is effectively dispersed in the copper matrix, by means of including iron (Fe) and nickel (Ni) in the copper alloy along with Bi, the free-machinable element.

However, the prior arts described in JP h11-293305, JP 2002-285262 and WO 2007/126006 A1 use a large amount of sulfide or compounds of low-melting-point metals, such as bismuth, as additives to the extent that it results in crystallization in the copper (Cu) base so that such crystallization serves as solid lubricant. The problem with this approach is that it is not viable from the standpoint of production cost and casting. For example, bismuth costs as much as 5 times more than copper metal, and can result in cost escalation if bismuth be added by 10 mass %. Another problem is that a copper alloy that features solid lubrication of crystallized compounds or sulfide can only realize the seizing resistance at half the level of lead bronze.

On the other hand, as explained above, the prior art described in JP 2007-297675 aims at producing lead-free casting copper alloy for the use as a material for water faucet clasps and wetted stopper, and thus is not sufficient from the standpoint of achieving both abrasion resistance and seizing resistance at high level. The focus of the invention according to JP 2007-297675, as explained in the paragraph 0018 for example, is on the improvement in machinability by means of sulfide formation while inhibiting an occurrence of a cavity, by taking into account that the melting point of the generated copper sulfide is made lower than the primary crystallization point (the first coagulation point) of copper due to the addition of Bi, Fe or Ni. In the first place, the invention according to JP 2007-297675 is intended for lead-free casting copper alloy for the material for water faucet clasps, wetted stopper and the like. Accordingly, for example, it intends to include Sn in the range of 3 to 4%, and thus gives no consideration to abrasion resistance and seizing resistance.

BRIEF SUMMARY OF THE INVENTION

In view of the above, the present invention has an object to provide a bronze alloy and sliding member that can realize superior abrasion resistance and seizing resistance while achieving low lead or lead-free; provide a bronze alloy with high industrial utility value and production method thereof, where the addition of expensive elements and/or the elements that inhibit casting can be held down, and thus enabling lower production cost; and provide a sliding member.

For example, spherical graphite cast iron is widely used in bearings and sliding members, but its characteristics widely vary depending on metal texture of the base. A texture constituted mainly of α-iron (ferrite) is utilized, because of its ductibility, in a structure that is subject to impact, but is not sufficiently abrasion resistant and seizing resistant for the use in bearings and sliding materials. On the other hand, because a texture mainly composed of pearlite structure, the lamellar eutectoid phase of α-Fe (ferrite) and iron carbide (cementite: $Fe_3C$), has moderate level of abrasion resistance and seizing resistance, casting iron applied to bearings and sliding members is controlled in terms of its structure in its production process so as to make it into pearlite base. The crucial point here is that the cast iron contains a large quantity of graphite which has superior solid lubrication, and has almost the same amount of graphite crystallization whether ferrite base or pearlite base, and that the difference between the two in terms of abrasion resistance and sliding capability largely depends on microscopic morphology of pearlite.

The morphology of pearlite is, a ferrite texture and a cementite texture are transformed at intervals of several hundred nm to 1 μm. Hardness of the ferrite texture is excessive-softer than Hardness of the cementite texture, and textures with different hardness differ in seizing resistance, thus inhibiting widening and diffusion of seizing from an early stage of seizing. Therefore, the morphology of pearlite is, inhibiting widening and diffusion of seizing from an early stage of seizing, and by the morphology of pearlite, enhanced abrasion resistance and sliding capability can be expected from the synergy effect from ferrite whose flexibility boosts affinity with shafts, the quality crucial for bearing members, and cementite whose hardness serves to increase abrasion resistance and sliding capability.

It has been known that, in a bronze with high proportion of tin, a eutectoid structure of δ-copper ($Cu_{31}Sn_8$) or ε-copper ($Cu_3Sn$), both being α-copper and copper-tin intermetallic compounds, is generated by phase transformation as in iron and steel. But its structure does not have similar morphology as pearlite, but has morphology similar to ledeburite, the coarse intermetallic compound with a small amount of grained α-copper precipitated therein. Such a material with uneven structure results in extreme decrease in tension strength and elongation, and for this reason, it has not been applied to industrial use. Incidentally, in bronze casting applied to industrial use, since the transformation into ε copper rarely occurs because the transformation into is δ-copper always occurs first, ε copper is obtained only after putting it to annealing for a long period of time at 350 deg C. or lower following heavy machination.

The present invention is, utilize the eutectoid transformation of bronze alloy and provide a copper alloy which is produced in a metal structure under as cast conditions that excels in abrasion resistance and seizing resistance by effecting the aforementioned the morphology of pearlite eutectoid phase, the morphology of pearlite with superior seizing resistance. Previously, industrially-used bronze alloy does not have the pearlite eutectoid phase in eutectoid transformation, and it has metal texture of single phase α-copper mixed with a small amount of granular δ-copper. The inventors of the present invention found that the eutectoid phase, in which the copper-tin intermetallic compound such as flake-like δ-copper or ε-copper is precipitated, can be easily and stably produced in α-copper by effecting a large amount of γ-copper from β-copper by adding such elements as sulfur, nickel, silver and so forth, which inhibit diffusion of tin within copper while facilitating solidification segregation by lowering the solubility limit of α-copper to the bronze mainly composed of copper and tin to solidify in dendrite, and besides on, by simultaneously adding a small amount of bismuth and nickel which can inhibit generation of δ-copper as well as lower the temperature at which eutectoid transformation occurs. Though bismuth and lead do not usually undergo solid solution in the copper matrix because they have liquid phase separation with copper, in the case of the alloy in which the aforementioned eutectoid phase is produced, bismuth (or an alloy of bismuth and lead) can undergo solid solution in β-copper with high concentration of tin depending on the additive amount of sulfur, where the solid solution-hardened bismuth (or an alloy of bismuth and lead) can be dispersedly precipitated in an eutectoid phase as fine bismuth grains (or fine bismuth-lead grains) of about 1 μm or less at average at the time of eutectoid transformation. Moreover, they found the abrasion resistance and seizing resistance are drastically improved for the present invention of the bronze alloy having the eutectoid phase with such fine texture.

The present invention has been created based on the above theory and findings. According to the present invention, the bronze alloy comprises copper and tin as basis, characterized in that a eutectoid phase, comprising a copper-tin intermetallic compound precipitated in α-copper and fine grains of metal including bismuth are dispersedly precipitated, is produced in a metal structure under as cast conditions. This eutectoid phase is produced by partial stabilization, through the use of additive elements, of β-phase generated by peritectic reaction. Further, the above eutectoid phase has a lamellar structure with the flaky copper-tin intermetallic compound precipitated in α-copper. The bronze alloy, characterized in that β-copper is produced while the use of three additive elements as nickel, bismuth and sulfur, serves to control the metal structure so as to include the eutectoid phase at the time of eutectoid transformation.

The bronze alloy, according to the invention, can also be defined from the standpoint of composition. In other words, this bronze alloy comprises copper and tin as main constituents and contains nickel, bismuth, and sulfur as additive elements, the nickel content being 0.5 to 5.0 mass %, the bismuth content being 0.5 to 5.0 mass %, and the sulfur content being 0.08 to 1.0 mass %, wherein the above eutectoid is formed.

It is possible to have the above eutectoid by adding nickel of more than or equal to 5% or silver of more than or equal to 10% instead of using sulfur, but such alternative is not viable because voluminous use of precious metals can result in tremendous cost escalation. Accordingly, in the present invention, the use of sulfur becomes an essential prerequisite. The bronze alloy, according to the invention, can also be defined from the standpoint of area as the pearlite eutectoid phase. It can also be possible to define the bronze alloy according to the present invention in terms of its having the pearlite eutectoid phase, where the proportion of the lamellar eutectoid phase is 10 to 70% by area. Incidentally, since the proportion of the lamellar eutectoid phase is controlled by the amount of β-copper generated by solidification segregation, such proportion can be controlled by adjusting the amount of tin content in the bronze alloy.

The above eutectoid phase can be formed by partial stabilization, by using additive elements, of the β phase generated by peritectic reaction. Therefore, the method of producing the bronze alloy, characterized in that a eutectoid phase, comprising the copper-tin intermetallic compound precipitated in α-copper and fine grains of metal including bismuth are dispersedly precipitated, is produced in a metal structure under as cast conditions through the partial stabilization, enabled by the use of additive elements, nickel, bismuth and sulfur to basis as copper and tin, of β-phase generated by peritectic reaction. By adding nickel, bismuth and sulfur to copper and tin, the latter two being the main constituents of the bronze alloy, the β phase generated by peritectic reaction is partially stabilized thanks to Ni that can bring about total solid solution in every proportion in relation to Cu. As a result, the reaction of Cu against Sn is suppressed, and the flaky copper-tin intermetallic compound is formed in α-copper while the fine metal grains including bismuth are precipitated.

The above bronze alloy has superior abrasion resistance and seizing resistance, and can be used as a sliding member. In other words, the bronze alloy of the present invention can be used as a material for a sliding member's sliding surface. Alternatively, the above bronze alloy can be bonded to a sliding surface made of iron.

The bronze alloy according to the present invention, with the compositional characteristics described above, has excellent seizing resistance comparable to lead bronze, and is superior in abrasion resistance, mechanical property and machinability and useful as an alternative industrial alloy material for bearings in place of lead bronze. Also, by utilizing the phase transformation described in the present invention, it becomes possible to provide the bronze alloy with high industrial utility value because, in comparison with the prior arts that utilize solid lubrication of crystallization phase or of generated compounds, it can contribute to improve productivity and suppress production cost by minimizing the additive amount of the elements that are costly, such as bismuth, or inhibit casting performance, such as sulfur.

Also, the sliding member (e.g. a hydraulic cylinder block) of the present invention is a bimetal formed by bonding the above bronze alloy to the sliding surface to an iron body by means of diffused junction, casting junction or press fitting. The above bronze alloy has excellent abrasion resistance and seizing resistance, hence the sliding member utilizing the above bronze alloy also has similar excellent quality, for example, superior bearing quality under continuous high load and high-speed sliding movement.

DESCRIPTION OF PREFERRED EMBODIMENTS

Next, the description will be made concerning concrete embodiments according to the present invention by referring to the drawings.

In cast iron, it is classically-observed that the base organization influences abrasion resistance and sliding capability. For example, to compare the ferrite base and pearlite base in spherical graphite cast iron, the pearlite base is superior in abrasion resistance. Pearlite has a lamellar structure comprising ferrite (α-copper) and cementite (iron carbide: $Fe_3C$) at the level of several hundred nm to 1 μm, whose morphological characteristics, the alternating layers of hard phase and soft phase, allows superior seizing tolerance. At the same time, its moderate hardness and strength serve to enhance affinity required of bearings. Pearlite is formed when austenite which contains high concentration of carbon at high temperature undergoes eutectoid transformation, and its lamellar structure, in terms of alloy organization, is thermodynamically stable.

The inventors of the present invention have developed the bronze alloy of the present invention, based on the idea that it is possible to realize the above advantage if a similar organization can be formed also in bronze. In other words, the basic idea entertained by the inventors of the present invention is that abrasion resistance can be improved by utilizing morphological features of metal in the bronze alloy of the present invention.

Varieties of copper alloy, such as high-strength brass and aluminum bronze, are commonly used as sliding members, but they do not have satisfying level of machinability and seizing resistance. Thus, according to the present invention, the alternative to lead bronze material can be realized by: taking the bronze copper alloy containing 4 to 20 mass % tin (Sn) as the base; achieving low lead or lead-free by replacing at least part of lead with bismuth; and improving mechanical property and seizing resistance by such methods as dispersing low-melting-point sulfide in the material.

The present invention makes use of the eutectoid transformation of tin-bronze at the temperature of 586 deg C. to 520 deg C. The eutectoid transformation of tin-bronze takes place in two steps as below, and the pearlite eutectoid phase (the intermediate phase comprising the lamellar structure wherein the flaky copper-tin intermetallic compound is precipitated in α-copper) is obtained by controlling the eutectoid transformation of β-copper or γ-copper through additive elements. In ordinary bronze, the metastability of the intermediate phase does not being itself to form at room temperature, but the above intermediate phase being to form at room temperature, because it is stabilized by additive elements, in the bronze alloy according to the present invention.

Eutectoid transformation: $\alpha_p + \beta \rightarrow \alpha_p + \alpha_s + \delta$ Two step transformation: $\beta \rightarrow \alpha_s + \gamma$ (586 deg C.), $\gamma \rightarrow \alpha_s + \delta$, or $\alpha'$ (520 deg C.)

$\alpha_p$: primary phase (primary crystallization phase)

$\alpha_s$: transformation generation (Sn: 2 to 4 mass %)

$\alpha'$: lamellar eutectoid phase (flake-like δ-copper or ε-copper is precipitated in α-copper)

β: stable and high-temperature phase with high concentration of Sn (Sn: 8 to 18 mass %)

γ: stable phase at the temperature of 586 deg C. or lower with high concentration of Sn (Sn: 16 to 25 mass %)

δ: intermetallic compound expressed by $Cu_{31}Sn_8$ (Sn: 32.5 mass %)

ε: intermetallic compound expressed by $Cu_3Sn$

In the eutectoid transformation of industrial bronze alloy (CAC406, 603 etc.), because of the wide rage of solidification temperature, α-copper with a small amount of Sn solid solidification is generated at the beginning of solidification, with the excess Sn of low melting point being exhausted and thickened. Consequently, immediately after the solidification, it results in α+β texture mixed with β-copper formed by peritectic reaction, containing a large amount of Sn solid solidification (Sn: 8 to 25 mass %). Then, β-copper undergoes eutectoid transformation into α+γ at 586 deg C., and γ-copper still undergoes eutectoid transformation into α+δ at 520 deg C. Incidentally, β-copper and γ-copper have the same crystal structure, and thus it is difficult to tell them apart by optical microscope. δ-copper has hard and fragile structure, with the composition $Cu_{31}Sn_8$ (Sn: 32.5 mass %). In this way, the eutectoid transformation of tin-bronze proceeds in two steps, but the form it is observed at room temperature is α+δ.

In the present invention, the eutectoid phase, in which α-copper and copper-tin based intermetallic compound formed the laminates in the form of pearlite, is produced stably and at ease, by adding sulfur (S) which inhibits the diffusion of Sn in copper as well as facilitates solidification segregation through lowering of solubility limit of α-copper in order to cause a large quantity of γ-copper to be transformed from β-copper, and also by simultaneously adding a small amount of bismuth (Bi) and nickel (Ni) in order to inhibit the development of δ-copper and to lower eutectoid transformation temperature through compositional super cooling. In other words, β-copper with high concentration of Sn is effected by adding S so as to narrow the Sn solubility limit in α-copper. Also, the addition of Ni serves to delay (stabilize) the beginning of eutectoid transformation of β-copper and inhibit the generation of coarse δ-copper agglomeration. Moreover, the addition of Bi helps to lower the eutectoid transformation temperature by compositional super cooling, while some portion of Bi undergoes solid solution. With the lower eutectoid transformation temperature, the diffusion speed of Sn also becomes slower while the agglomerate development of δ-copper is inhibited, resulting in the generation of copper-tin based intermetallic compound out of oversaturated tin in α-copper. Since such intermetallic compound is generated with small free energy of formation, that is, in the form of flaky precipitation in α-copper, the eutectoid phase α' with two types of structure of widely different hardness alternating at intervals of several hundred nm to several μm (lamellar eutectoid phase α') can be obtained. The Bi that has underwent solid solution in β-copper becomes dispersedly precipitated as fine bismuth grains (fine metal grains) in the eutectoid phase at the time of eutectoid transformation. Incidentally, it has been confirmed by Electron Probe Micro Analyzer (EPMA) that the precipitated bismuth is not chemical compound. Since the ratio of the eutectoid phase formation is controlled by the amount of β-copper generated by solidification segregation, it can be possible to control the ratio of the eutectoid phase formation in the metal structure by adjusting the content of tin in the bronze. Moreover, it is acceptable to have a small amount of additive nickel and sulfur in the copper-tin intermetallic compound formed in this instance.

Figure 1:
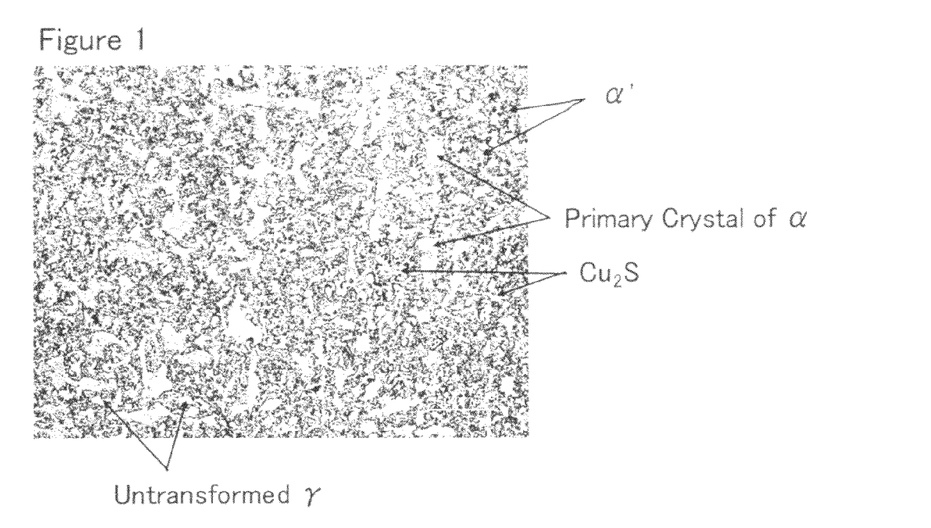
FIG. 1 is a microscope photograph of the bronze alloy in which the lamellar eutectoid is formed by the simultaneous addition to copper-tin of 0.7 mass % sulfur, 1.5 mass % nickel and 3 mass % bismuth.

FIG. 1 is a metallographic photograph of the bronze alloy in which the eutectoid phase α' is formed. The lamellar structure of the eutectoid phase α' can be seen, as shown in the electron microscope photograph in FIG. 2, by means of etching that uses hydrochloric acid alcohol solution that contains ferric chloride. FIG. 3 is a back scattered electron composition image (BSI) of the eutectoid phase. In FIG. 1, the phase a (primary crystallization) is shown by light color, whereas the eutectoid phase α' is shown by dark color. $Cu_2S$ is expressed by intermediate color. In FIG. 3, fine grains of bismuth appear in whiteness, the phase a in darkness, the copper-tin intermetallic compound in small-sized intermediate color, and the untransformed β-copper with high concentration of tin is shown by the continuum of intermediate color. The bronze alloy according to the present invention, in addition to its morphological feature where the soft α-copper and the hard copper-tin intermetallic compound alternate at intervals of several hundred nm in the above eutectoid phase α', has superior abrasion resistance and seizing resistance enabled by dispersion precipitation of fine grains of bismuth as compared to lead bronze, especially under boundary lubrication condition. Incidentally, the excess of the S that has been added to produce the eutectoid phase α' seems to contribute to the enhancement of abrasion resistance by reacting with Cu to generate the low-melting-point sulfide ($Cu_2S$) and by dispersion intervening in the base, but its effect is significantly smaller compared with the effect achieved by the above morphological feature and dispersion precipitation of fine bismuth grains.

The bronze alloy according to the present invention, as described above, has the eutectoid phase α' of lamellar structure comprising, dispersedly precipitated therein, fine bismuth grains by virtue of adding the elements that can lower the solubility limit of α-copper in tin-bronze, inhibit the development of δ-copper, and lower the eutectoid transformation temperature. From the standpoint of alloy composition, it is essential to add simultaneously an appropriate amount of S, Bi and Ni, respectively. Consequently, from the standpoint of composition, the bronze alloy according to the present invention can be defined as the bronze alloy in which β-copper is formed and that its metal structure is controlled so as to include the above eutectoid phase at the time of eutectoid transformation by adding nickel, bismuth and sulfur.

Since each additive element has an optimum range of additive amount, it is preferable to have Ni content of 0.5 to 5.0 mass %, Bi content of 0.5 to 7.0 mass %, and S content of 0.08 to 1.2 mass %. Next, the description will be given concerning the additive amount of each additive element.

In bronze casting, Ni is widely used as an useful element that serves to enhance pressure resistance by improving long-range solidification mode so as to decrease fine contraction cavities and also enhance mechanical property by undergoing solid solution into the base that is α-copper. When the amount of Ni exceeds or even equals to 5 mass %, a copper-Ni intermetallic compound (θ phase) is precipitated. The inventors of the present invention have found that, when 1.5 mass % Ni is added to phosphor bronze containing 0.3 mass % sulfur and 2.5 mass % Bi, the lamellar eutectoid phase α' is formed along with the enhancement in abrasion resistance and seizing resistance. The bronze solidified at high temperature results in eutectoid transformation at the temperature range from 586 deg C. to 520 deg C. and generates α-copper (Sn: 2 to 4 mass %) and δ-copper (Sn: 32.5 mass %). When this occurs, the eutectoid phase α' comprising a layer of α-copper and a layer of a copper-tin intermetallic compound is formed unless δ-copper is developed by diffusion of Sn in copper. 0.05 mass % or less Ni does not give a sufficient effect (solid solution amount) of inhibiting the development of δ-copper and diffusion of Sn in copper. If Ni is 5 mass % or more, Ni will not go through complete solid solution and will generate θ phase. Thus, the appropriate additive amount of Ni (contained amount) is 0.5 to 5.0 mass %. The amount of Ni should preferably be 1.0 to 3.0 mass %.

Bi (bismuth) is low-melting-point metal in copper which rarely undergoes solid solution, which is like as lead. Bi (bismuth) is used in a variety of lead-free copper alloy, in agglomerated form, to fill in fine contraction cavities in dendrite that tend to appear in copper-tin so that pressure resistance be enhanced. But, addition of excessive amounts of Bi may affect, like lead, mechanical property such as elongation and impact value. The result of an experiment of adding Bi to phosphor bronze containing 0.5 mass % sulfur and 1.5 mass % Ni (nickel) was that the lamellar eutectoid phase α' appeared with the addition of about 1.0 mass % Bi, whereas the excess Bi became crystallized with the addition of 7.0 mass % or more Bi. Thus, the appropriate additive amount of Bi is 0.5 to 7.0 mass %. The amount of Bi should preferably be 2.0 to 5.0 mass %.

On being absorbed into the melt when dissolved in a furnace that uses fuel with much sulfur content, such as a heavy oil furnace, S generates copper sulfide while generating $SO_2$ gas by combining with the oxygen in the melt, causing air bubble cavities. For this reason, the permissible amount of S is normally 0.08 mass % or less. However, S contributes, more than any other additive element, to the increase of precipitation amount of fine bismuth grains in the eutectoid phase by stabilizing the lamellar eutectoid phase α' and significantly increasing the level of the solubility limit of Bi into β-copper. For example, the lamellar eutectoid phase α' is formed even with an addition of 0.1 mass % S to a tin-bronze containing 1.5 mass % Ni and 2.5 mass % Bi. In the case of melting in an electric furnace, sulfur in copper alloy can be easily increased by using commercial vulcanizing agent, and removal by oxidative melting is relatively easy. However, with the addition of 1.2 mass % or more S, the viscosity of the melt increases significantly, whereby pouring of molten metal becomes difficult, while air bubble cavities deriving from $SO_2$ gas also dramatically increase. Thus, the appropriate additive amount of S is 0.08 to 1.2 mass %. The amount of S should preferably be 0.15 to 0.5 mass %.

The bronze alloy according to the present invention can also be defined from the standpoint of the area ratio of the lamellar eutectoid phase α'. In this case, the bronze alloy according to the present invention can be described as the bronze alloy in which the lamellar eutectoid phase comprising, dispersedly precipitated therein, fine bismuth grains, forms at a prescribed area ratio. Here, the proportion (area ratio) of the eutectoid phase should preferably be 10 to 70 area %, and still preferable if it is 20 to 70 area %. When the area ratio of the lamellar eutectoid phase α' is less than 10 area %, then enough abrasion resistance and seizing resistance deriving from the lamellar structure and precipitation of fine bismuth grains cannot be obtained. Further, the higher the area ratio of the lamellar eutectoid phase α' is, the higher the abrasion resistance become. But, because this bronze alloy utilizes solidification segregation of Sn in bronze, it is difficult to prevent the formation of primary crystallization α and of some residues of modified α-copper and β-copper. Therefore, it is virtually difficult to have the area ratio of the eutectoid phase α' that exceeds 70 area %. Moreover, in order to obtain sufficient seizing resistance and abrasion resistance for the sliding member, it is preferable that the area ratio of the lamellar eutectoid phase α' is 20 area % or more, and in this case, it is necessary to have Sn concentration of 8 to 15 mass %, and it is preferable when it is 10 to 13 mass %.

Figure 2:
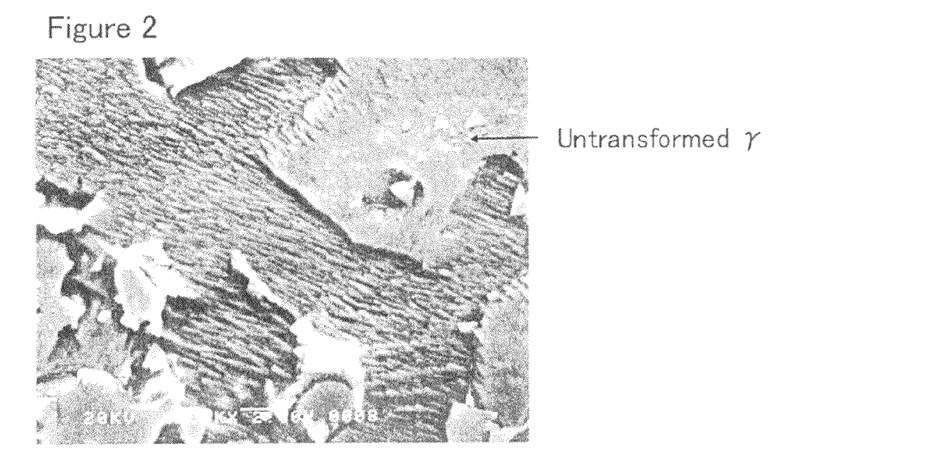
FIG. 2 is an electron microscope photograph of the pearlite structure of the lamellar eutectoid phase.
Figure 3:
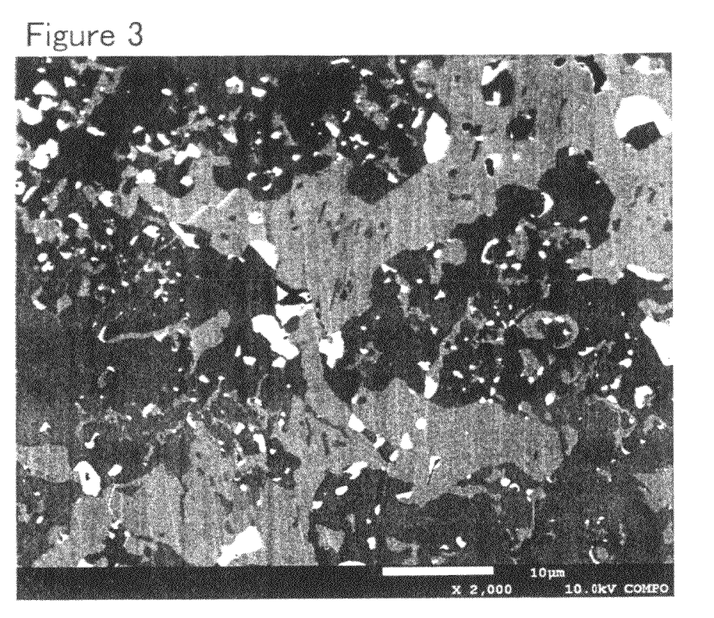
FIG. 3 is a back scattered electron composition image (BSI) of the eutectoid phase in which fine grains of bismuth are precipitated.

Incidentally, the formation of the lamellar eutectoid phase α' can be easily determined by identifying the lamellar structure (layered structure) as shown in FIG. 2. Also, the proportion of the lamellar eutectoid phase α' can be easily calculated by image analysis of metal structure. In order to make the above lamellar eutectoid phase α' identifiable, some elaboration on surface processing (etching) is required before observation.

For example, by etching the surface of the bronze alloy with hydrochloric acid alcohol solution (e.g. ferric chloride 5 g+hydrochloric acid 10 mL+ethyl alcohol 85 mL) after mirror polishing, the lamellar eutectoid phase α' can be clearly observed as dark area in metal structure. Accordingly, by calculating the proportion (area) colored in darkness in metal structure, we can obtain the proportion of the lamellar eutectoid phase α'.

In the above bronze alloy, it is possible to further enhance its feature by adding a small amount of lead. It may be preferable not to add lead from the standpoint of environmental regulations. But if lead is added within a range permitted, by the environmental regulations, the mode of primary phase dendrite is changed and further enhancement of seizing resistance and superior bearing quality than conventional lead bronze, especially under high-speed and high-pressure sliding, will be obtained. In concrete terms, when lead of several mass %, along with bismuth, is added, Pb that has undergone solid solution in β-copper becomes precipitated in the eutectoid phase as fine lead grains or fine bismuth-lead alloy grains at the time of eutectoid transformation. At the same time, the development of a dendrite is inhibited to result in the net-like formation of the lamellar eutectoid phase α', with higher seizing resistance PV value by 10 to 20%, while the cutting resistance is lowered by about 10% due to lead's free-cutting effect. As described above, when lead is added, its appropriate additive amount should be 4 mass % or less from the standpoint of environmental regulations. The amount of lead should preferably be 1.5 to 3.0 mass %.

Also, in the above bronze alloy, it is possible to improve casting performance, including runner condition, by adding zinc. Zinc more easily combines with oxygen than copper and tin. Also, since the resultant zinc oxide immediately escapes from the melt, the use of zinc may effectively prevent the occurrence of air bubble defects that can be caused by the presence of oxide as well as by gas exhaust from chemical compounds, especially for such melt for the present bronze alloy which contains a large amount of tin. Further, zinc can serve to increase a little the formation ratio of the lamellar eutectoid phase α' in metal structure to improve mechanical property, because it tends to narrow the solubility limit of tin in α-copper. However, as the amount of zinc increase, the corrosion resistance and seizing resistance decrease. Thus, the appropriate additive amount of zinc is 5 mass % or less. The amount of zinc should preferably be 1.0 to 3.0 mass %.

The bronze alloy according to the present invention can be produced by adding the additive elements Bi, Ni and S to the main constituents Cu and Sn by using the same method as ordinary bronze alloy. By adding the additive elements nickel, bismuth and sulfur to the main constituents of the bronze alloy, Cu and Sn, β phase generated by peritectic reaction is partially stabilized with the alloy elements, whereby the copper-tin intermetallic compound is precipitated in α-copper and the eutectoid phase is formed with fine metal grains including bismuth are dispersedly precipitated therein. The order of addition of each additive element can be arbitrarily chosen, but normally the more solvent element is added first and then the low-melting point metal, later.

The above bronze alloy is suitable to casting, but can also be applied to powder metallurgy, expanded materials and rolled materials. Also, since the above bronze alloy excels in seizing resistance and abrasion resistance but has low ductility, it is suitably applied, for example, to the sliding member in the form of bimetal with steel. Such sliding member's surface can be made of the above bronze alloy. For example, the above bronze alloy can be bonded to the iron-based base material, so as to have the surface of the sliding member made of the above bronze alloy. It will be possible to achieve cost reduction through such an application rather than having the whole sliding member made with the above bronze alloy. The forming method of the bronze alloy into the sliding member can be chosen arbitrarily.

Figure 4:
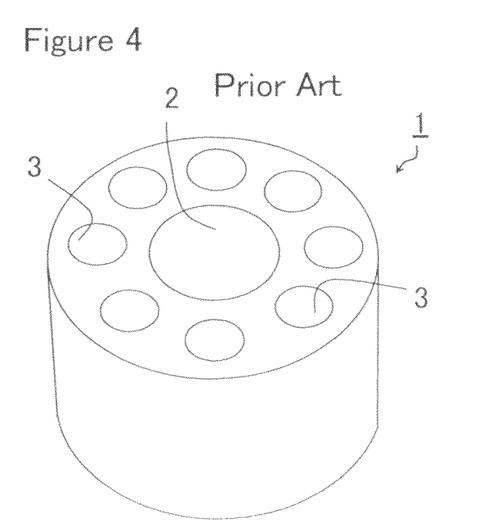
FIG. 4 is a simplified perspective view showing an example of a hydraulic cylinder block as prior art.

Concrete examples of the sliding member include an axial piston hydraulic pump used in construction machinery and a cylinder block of a motor. One example is shown in FIG. 4 where an axial piston hydraulic pump's hydraulic cylinder block 1 is made of steel, an iron-based material, processed into cylindrical configuration. It has a shaft bore 2 in the middle into which a drive shaft is inserted, and surrounding the shaft bore 2 are a plurality of bores 3 into which pistons are inserted. In the case of the axial piston pump of the swash plate type, each one of the pistons is inserted in each of the above bores 3 as these pistons move in reciprocating motion, sliding on the slant plate (yoke) in accordance with the rotational movement of the hydraulic pressure cylinder block 1.

In the bores 3 and shaft bore 2 of the above the hydraulic pressure cylinder block 1, the pistons and drive shaft sliding with high-speed under high pressure. So, by using the bronze alloy according to the present invention for the inner surface of these bores 3 and shaft bore 2, it will be possible to realize the hydraulic pressure cylinder block that excels in abrasion resistance with no seizing. Means of forming the inside of the bores 3 and shaft bore 2 with the bronze alloy according to the present invention include, for example, joining the above bronze alloy to the inside of the bores 3 and shaft bore 2 of the hydraulic pressure cylinder block 1 made of steel by casting junction or diffused junction; or press fitting the bronze alloy material, processed into a cylindrical shape, to the inside of the above bores 3 and shaft bore 2.

The hydraulic pressure cylinder block 1, configured in the manner described above, is superior in seizing resistance and abrasion resistance, and is able to provide stable sliding feature under harsh conditions including high pressure and high speed. The application of the bronze alloy according to the present invention is not limited to the above axial piston hydraulic pump and the cylinder block of a motor, but can also include a wide range of sliding surface such as valve plates, piston shoes and cradles.

EXAMPLES

Next, the description will be made concerning examples according to the present invention by referring to experimental results.

Abrasion Resistance Test

A number of bronze alloys with varying composition as follows were made, followed by a to cylinder abrasion resistance test with a steel axis of rotation. The bronze alloys C and D as present invention corresponded to the examples in which the lamellar eutectoid phase α', with fine bismuth grains were precipitated therein, was formed. On the other hand, the bronze alloys A, B, E, F, which corresponded to comparative examples as prior art, showed no such formation.

Bronze alloy A (prior art): Cu-12Sn-1.5 Ni-0.6S
Bronze alloy B (prior art): Cu-12Sn-1.5 Ni-0.6S-3Pb
Bronze alloy C (present invention): Cu-12Sn-1.5 Ni-0.6S-5Bi
Bronze alloy D (present invention): Cu-12Sn-1.5 Ni-0.6S-5Bi-2Pb
Bronze alloy E (prior art): Cu-13Sn-1.5 Ni-10Pb
Bronze alloy F (prior art): Cu-10Sn-10Pb

[The figure in each bronze alloy refers to the contained amount (mass %) of each element.]

Figure 5:
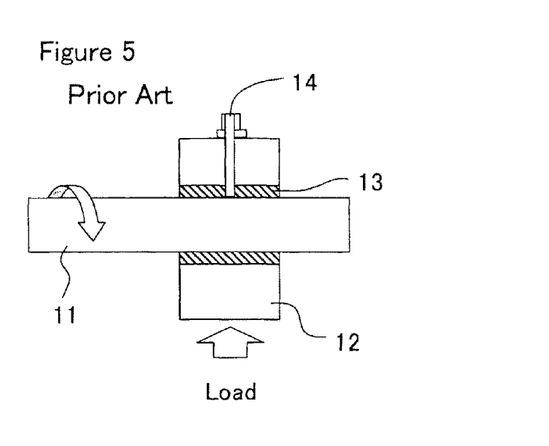
FIG. 5 is a simplified graph of the composition of a cylinder abrasion testing equipment used for a cylinder abrasion test as prior art.

As shown in FIG. 5, the cylinder abrasion test was conducted by inserting an axis of rotation 11 into a steel housing 12 into which a cylindrical shaped bearing test piece 13 was press fitted, as press load was exerted by the hydraulic press cylinder against the housing 12 from the direction of the arrow A. The axis of rotation 11, with the diameter of 40 mm, is rotated as lubricating oil (turbine oil #32) was supplied from an oil discharge bore 14 with the pressure of 0.5 MPa. The testing speed was set at 1.5 m/s and 3 m/s, the stress load at 3 kN to 12 kN (constant), and the testing time at 2 hours. The results are shown in Table 1. In Table 1, ○ indicates no abnormality in seizing and abrasion, X indicates seizing and abnormality in abrasion, and - indicates no testing conducted under the above conditions.

TABLE 1

| | Testing speed | Load | | | | |
| --- | --- | --- | --- | --- | --- | --- |
| | | 3 kN | 5 kN | 7.5 kN | 10 kN | 12 kN |
| Bronze Alloy A | 1.5 m/s | ○ | ○ | X | — | — |
| | 3 m/s | X | — | — | — | — |
| Bronze Alloy B | 1.5 m/s | ○ | ○ | ○ | X | — |
| | 3 m/s | X | — | — | — | — |
| Bronze Alloy C (present invention) | 1.5 m/s | — | ○ | ○ | ○ no abrasion | — |
| | 3 m/s | ○ | ○ | X | — | — |
| Bronze Alloy D (present invention) | 1.5 m/s | — | — | ○ | ○ | ○ no abrasion |
| | 3 m/s | ○ | ○ | ○ | X | — |
| Bronze Alloy E | 1.5 m/s | ○ | ○ | X | — | — |
| | 3 m/s | X | — | ○ | — | — |
| Bronze Alloy F | 1.5 m/s | ○ | ○ | ○ | ○ no abrasion | ○ no abrasion |
| | 3 m/s | X | X | — | — | — |

As it is clearly shown in Table 1, in the bronze alloys C and D as present invention in which Ni and Bi were simultaneously added in addition to sulfur, resulting in the formation of the lamellar eutectoid phase with the fine grains of bismuth, abrasion resistance greater than lead bronze (bronze alloys E and F) was obtained, indicating significant improvement in abrasion resistance especially under high speed (testing speed at 3 m/s).

Seizing Resistance Test

Figure 6:
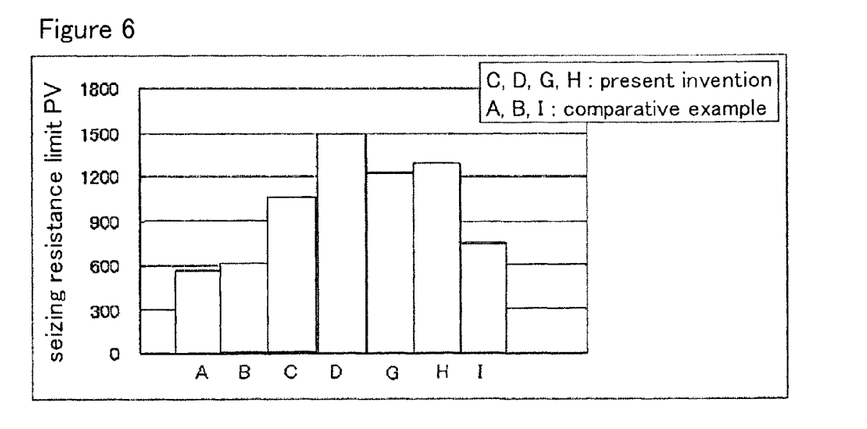
FIG. 6 is a characteristics diagram showing the relationship between the composition of the bronze alloy and the seizing resistance limit PV value.

The seizing resistance limit PV value was measured for the bronze alloys G and H with composition as below (working examples) and the bronze alloy I (a comparative example), in addition to the above bronze alloys A to D. The results are shown in FIG. 6.

Bronze alloy G (present invention): Cu-12Sn-1.5 Ni-3Bi-1.0S

Bronze alloy H (present invention): Cu-12Sn-1.5 Ni-3Bi-2Pb-1.0S

Bronze alloy I (prior art): Cu-12Sn-1.5 Ni-3Bi-2Pb-1.0Si

[The figure in each bronze alloy refers to the contained amount (mass %) of each element.]

As it is clearly shown in FIG. 6, the bronze alloys C, D, G, H which utilized the present invention exhibited superior seizing resistance. The lamellar eutectoid phase did not form in the tin-bronze in which α-copper underwent solid solution strengthened (bronze alloys A, B etc.). Consequently, these bronze alloys had seizing resistance limit PV value of about half the value of the bronze alloys C, D, G, H to which the present invention applied.

Cutting Test

A cutting test was conducted on the following bronze alloys. The tool used in this test was a commercial PVD coated cemented carbide tip. Cutting conditions were: cutting speed was set at 150 m/min., feed rate at 0.3 m/rev., and depth of cut at 3.0 mm. A similar test was also conducted for the bronze alloy E (comparative example) for the sake of comparison. The results are shown in Table 2.

Bronze alloy K (present invention): Cu-12Sn-1.5 Ni-0.6S-3Bi

Bronze alloy L (present invention): Cu-12Sn-1.5 Ni-0.6S-3Bi-3Pb

[The figure in each bronze alloy refers to the contained amount (mass %) of each element.]

TABLE 2

| | Principal force kgf | Feed force kgf | Thrust force kgf | Total force kgf |
| --- | --- | --- | --- | --- |
| Bronze Alloy E | 53.6 | 10 | 7.7 | 55.1 |
| Bronze Alloy K (present invention) | 53.4 | 12.6 | 7.9 | 55.4 |
| Bronze Alloy L (present invention) | 47 | 10.9 | 7.2 | 48.8 |

The bronze alloys K and L, to which the present invention was applied, showed an equally low cutting resistance as the bronze alloy E, a lead bronze. This level of cutting resistance will not be a problem at high-volume production. Also, it was found that cutting resistance in the bronze alloy L, in which Bi and Pb were simultaneously added, was decreased by about 10% compared to the bronze alloy E, which is prior art.

Examination of Composition

Figure 7:
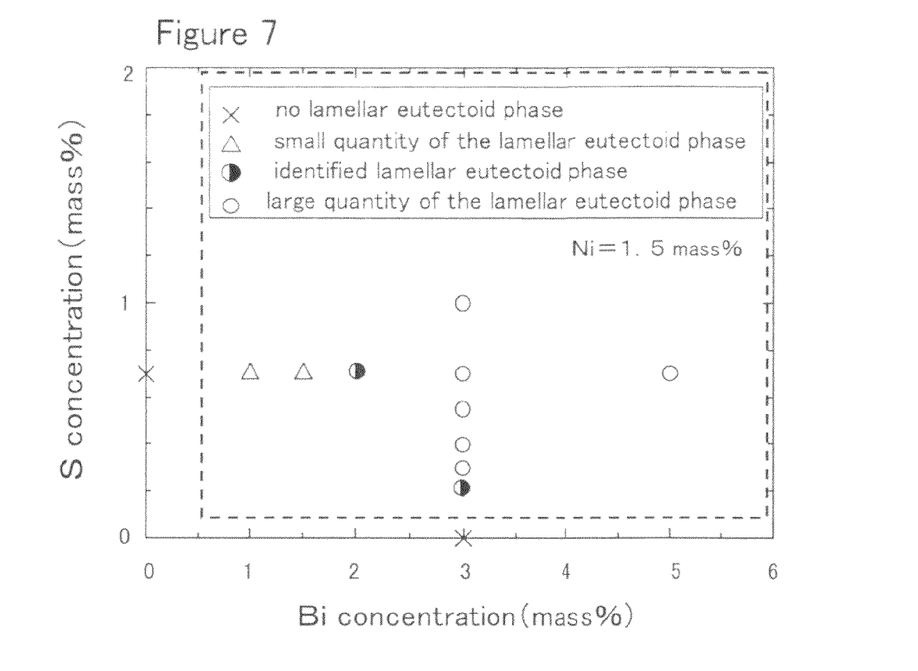
FIG. 7 is a diagram showing the composition range in which the lamellar eutectoid phase is formed with various additive amount of sulfur and bismuth while maintaining the additive amount of nickel at 1.5 mass %.
Figure 8:
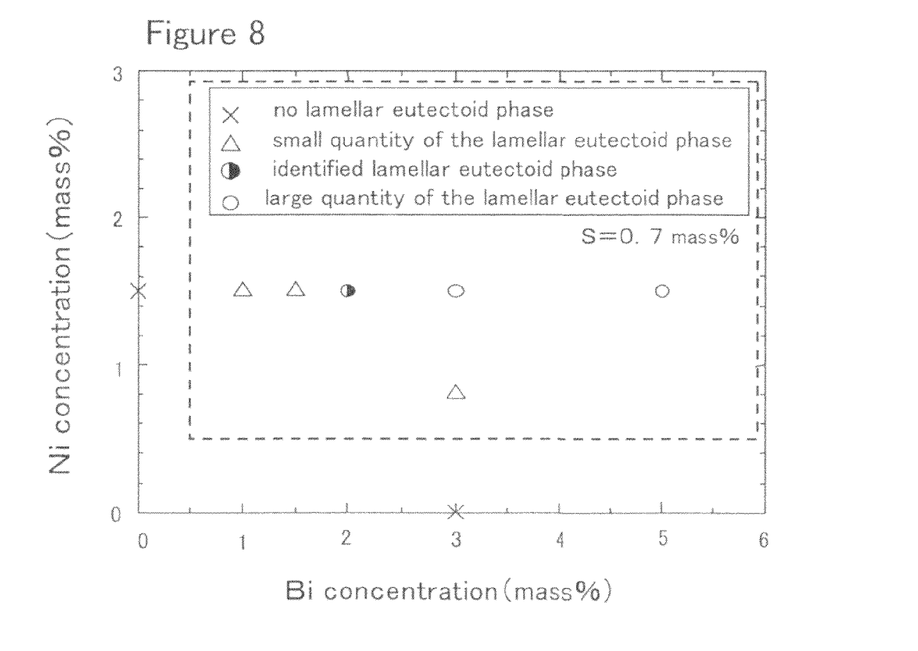
FIG. 8 is a diagram showing the composition range in which the lamellar eutectoid phase is formed with various additive amount of nickel and bismuth while maintaining the additive amount of sulfur at 0.7 mass %.

The composition of the bronze alloy containing 12 mass % Sn, and where the lamellar eutectoid phase was formed, was examined. FIG. 7 shows the compositional range enabling the formation of the lamellar eutectoid phase with the constant Ni additive concentration (1.5 mass %) and varying additive concentration of S and Bi. FIG. 8 shows the compositional range enabling the formation of the lamellar eutectoid phase with the constant S additive amount ratio (0.7 mass %) and varying additive concentration of Ni and Bi. In both Figures, the formation of the lamellar eutectoid phase was identified in the area framed by broken line.

FIG. 7 shows that the lamellar eutectoid phase was identified when 0.08 mass % or more S was added. A small quantity of the lamellar eutectoid phase was formed when the additive amount of Bi was set at 0.5 mass % or more, whereas the necessary quantity of the lamellar eutectoid phase was identified when 2.0 mass % or more Bi was added. Similarly, FIG. 8 shows that addition of 0.5 mass % or more Ni enabled the lamellar eutectoid phase, though in a small quantity. As for Bi, as in the case of FIG. 7, a small quantity of the lamellar eutectoid phase was formed when the additive amount of Bi was set at 0.5 mass % or more, whereas the necessary quantity of the lamellar eutectoid phase was identified when 2.0 mass % or more Bi was added.

Figure 9:
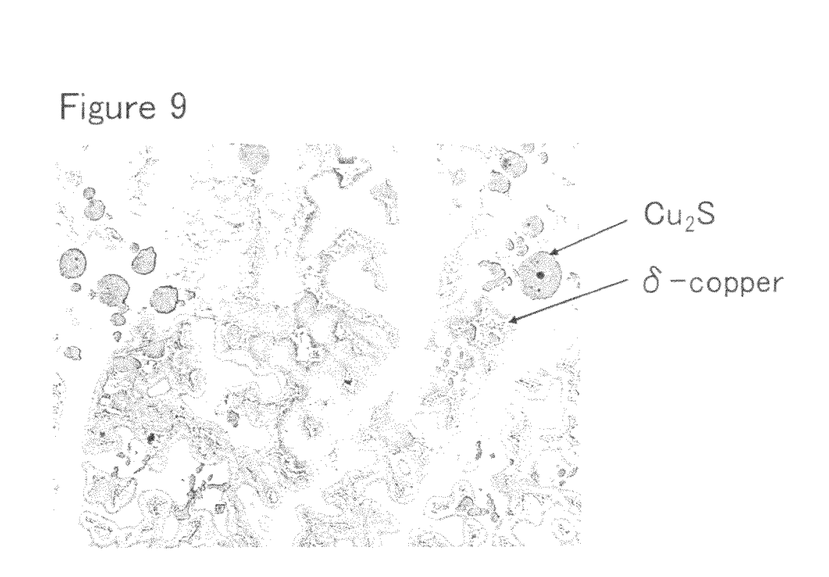
FIG. 9 is a microscope photograph of the metal structure when 1 mass % sulfur is added to tin-bronze.
Figure 10:
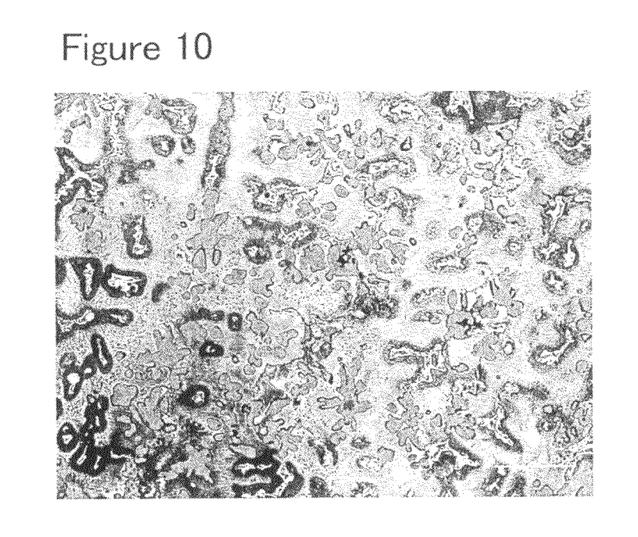
FIG. 10 is a microscope photograph of the metal structure when 1 mass % sulfur and 3 mass % bismuth are added to tin-bronze.
Figure 11:
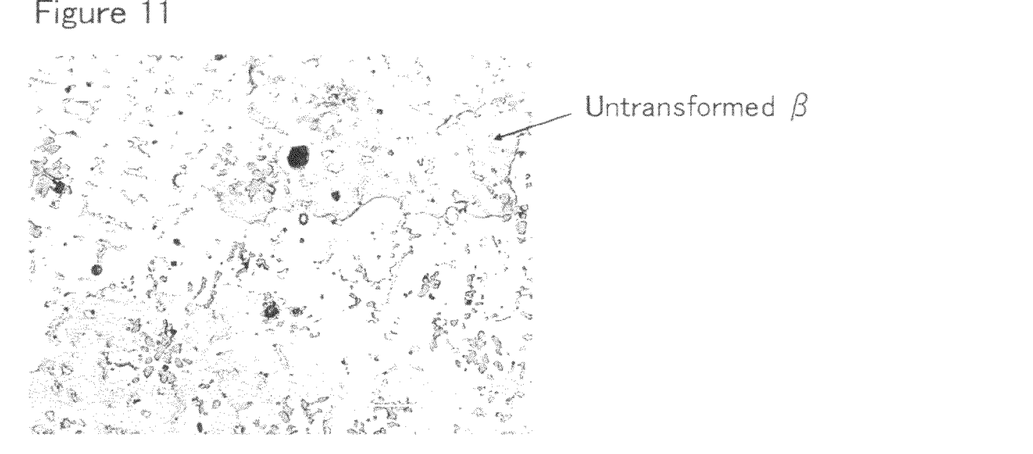
FIG. 11 is a microscope photograph of the metal structure when 0.7 mass % sulfur and 1.5 mass % nickel are added to tin-bronze.

On the other hand, FIGS. 9 to 11 show the change in metal structure depending on the addition of each element. Before the observation, the metal structure was given etching with hydrochloric acid alcohol solution (e.g. ferric chloride 5 g hydrochloric acid 10 mL+ethyl alcohol 85 mL) after mirror polishing. FIG. 9 shows the metal structure of tin-bronze with addition of 1 mass % sulfur, FIG. 10, the metal structure of tin-bronze with 3 mass % bismuth in addition to 1 mass % sulfur, and FIG. 11, the metal structure of tin-bronze with 0.7 mass % sulfur and 1.5 mass % nickel.

When only sulfur was added, much β phase (in darkness), the primary crystallization a dendrite where tin concentrates in the space between dendrite arms, was produced as shown in FIG. 9, which means that the β phase was stabilized by the facilitation of solidification segregation. In the middle of the β phase, coarse δ-copper agglomeration appeared due to peritectic reaction. Sulfide crystallized in the primary crystallization a dendrite was $Cu_2S$ which was formed at higher temperature than the primary crystallization point. When Bi was added to the above, the quantity of the p phase decreased, as shown in FIG. 10, as sulfide moved into the space between dendrite arms of the primary crystallization α, which means that the melting point of sulfide decreased below the primary crystallization point, while the space between the primary crystallization a dendrite arms became narrower due to the facilitation of eutectoid transformation. Also, the agglomerated δ-copper became divided and rounded out as it grew by eutectoid transformation. On the other hand, when Ni was added, as shown in FIG. 11, δ-copper production by peritectic reaction was inhibited to result in a small quantity of δ-copper, which was then transformed, along with the base, into α+copper-tin intermetallic compound through the eutectoid transformation of the β phase, with some residue of untransformed β. These examples of structural changes indicate the fact that the eutectoid transformation in tin-bronze can be controlled by alloying with S, Bi and Ni, and confirm the hypothesis of the lamellar eutectoid phase production described above.

On contrary, in the tin-bronze into which S, Bi and Ni were simultaneously added, the β phase generated in the space between dendrite arms did not generate agglomerated δ-copper and was transformed into the lamellar eutectoid phase with α+copper-tin intermetallic compound, as shown in FIG. 1. What appears as an ameba-like phase is the residue of concentrated S resulting in stabilized γ or β phase, remaining as an untransformed phase in the base. FIG. 2 shows the untransformed phase whose border areas are eaten in the lamellar form. FIG. 3 shows fine bismuth grains precipitated evenly, where an element with a larger atom number appears in lighter color.

Therefore, the mechanism by which the lamellar eutectoid phase, with fine bismuth grains precipitated evenly therein, is formed is that: (1) solid solution of Bi is enabled by adding S which narrows Sn's solubility limit in α-copper and generates β-copper with high concentration of Sn; (2) the increase in the production amount of β-copper is enabled by adding Ni which inhibits generation via peritectic reaction of δ-copper and diffusion of Sn into δ-copper, leading to the oversaturation of Sn in α-copper; (3) due to the compositional super cooling effected by the addition of Bi, the eutectoid transformation temperature is lowered, whereby the diffusion speed of Sn decreases. The oversaturated Sn and Bi are precipitated in laminate as a copper-tin intermetallic compound through eutectoid transformation, while fine bismuth grains are precipitated.

Examination of the Area Ratio of the Lamellar Eutectoid Phase

Figure 12:
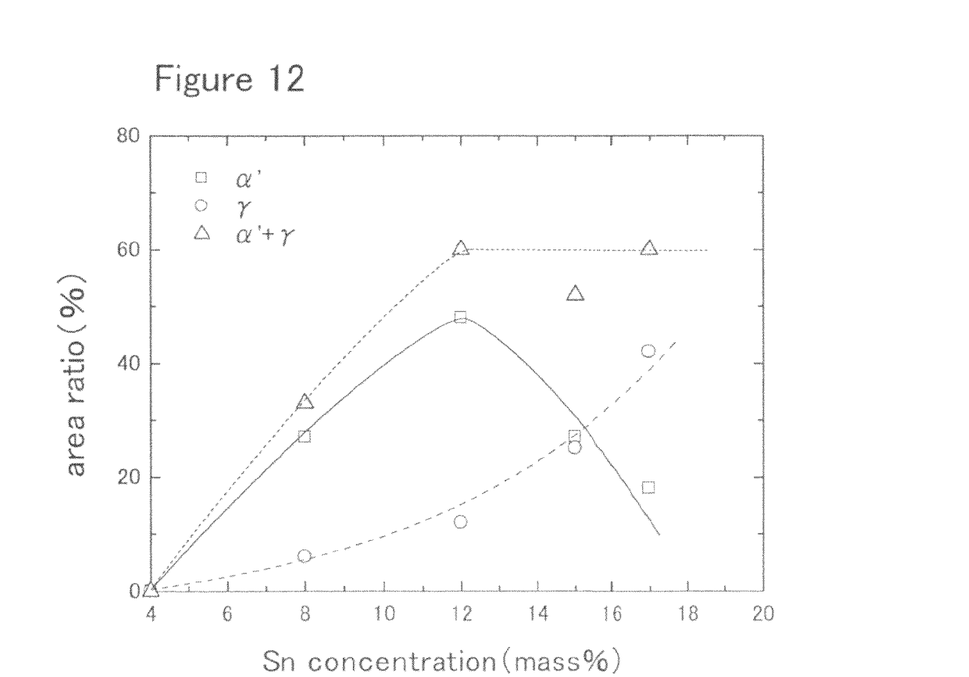
FIG. 12 is a diagram showing the relationship between the area ratio of the eutectoid phase and tin concentration in tin-bronze containing 3 mass % bismuth, 0.4 mass % nickel and 1.5 mass % sulfur.

FIG. 12 shows the relationship between Sn concentration and the area ratio of the lamellar eutectoid phase α' with respect to the untransformed phase (γ) in the bronze containing 3 mass % Bi, 1.5 mass % Ni and 0.4 mass % S. Eutectoid transformation takes place only in β-copper where Sn in the space between the primary crystallization a dendrite arms become concentrated, and α'+γ in FIG. 12 corresponds to β-copper production. Since β-copper production amount becomes constant value at Sn concentration of 12 mass % or more, the quantity of the lamellar eutectoid phase α' never exceeds this amount, either. With Sn concentration of 4 mass % or less, the whole thing results in α-copper, thus no eutectoid transformation takes place. But within the Sn concentration range of 4 to 12 mass %, the production of the lamellar eutectoid phase α' increases linearly in proportion to Sn concentration. On the other hand, the residual amount of the untransformed phase increases due to the stabilization of γ copper that occurs in conjunction with the increase in Sn concentration, hence the quantity of the lamellar eutectoid phase α' declines where Sn concentration is 12 mass % or more.

Figure 13:
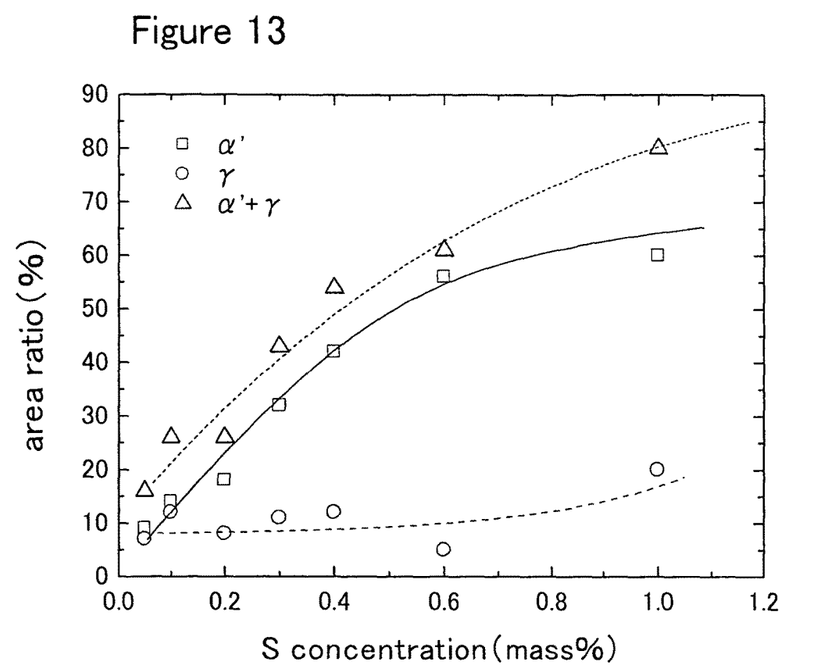
FIG. 13 is a diagram showing the relationship between the area ratio of the eutectoid phase and sulfur concentration in tin-bronze containing 12 mass % tin, 3 mass % bismuth, 2 mass % lead and 1.5 mass % nickel.

FIG. 13 shows the relationship between S concentration and the area ratio of the lamellar eutectoid phase α' with respect to the untransformed phase (γ) in the tin-bronze containing 12 mass % Sn, 3 mass % Bi, 2 mass % Pb and 1.5 mass % Ni. As shown in FIG. 13, α'+γ that corresponds to the quantity of β-copper exhibits an exponential behavior, where β-copper exists in about 80 area % with S concentration of 1 mass %. In the S concentration range of 0.05 to 0.6 mass %, because the untransformed quantity remains at constant value, the lamellar eutectoid phase α' increases in proportion to S concentration. With S concentration of 0.6 mass % or more, the untransformed γ tends to increase due to the stabilization of γ-copper, hence the lamellar eutectoid phase α' becomes saturated in about 60 area % in the tin-bronze of this alloy composition. Incidentally, since γ-copper is stabilized by being affected largely by Ni, it will be possible to bring its quantity closer to that of β-copper generated at the time of coagulation by decreasing Ni additive amount to optimum value.

From these experimental results, the viable area ratio of the lamellar eutectoid phase α' in the bronze alloy according to the present invention will be within the range of 10 to 70 area %. It is possible to maintain the area ratio of the lamellar eutectoid phase α' within the range of 10 to 70 area % by adjusting the content ratio of each element in the bronze alloy, whereby high seizing resistance and abrasion resistance can be obtained.

In addition, concerning further improvement in seizing resistance and abrasion resistance required of the sliding member operated under high pressure and at high speed, the area ratio of the above lamellar eutectoid phase α' within metal structure should preferably be 20 area % or more. With the area ratio of 20 area % or more, it will be possible to realize higher level of seizing resistance and abrasion resistance in the sliding member operated under high pressure and at high speed. From the standpoint of composition, Sn concentration should preferably be 8 to 15 mass %, or should still preferably be 10 to 13 mass % (see FIG. 12).

For example, in the bronze alloy with the composition Cu-9Sn-1Ni-2Bi-0.4Si, the above area ration was 24 area %, with the seizing resistance limit PV value of 795. That is, by having the area ratio of the lamellar eutectoid phase α' of 20 mass % or more, higher seizing resistance limit PV value than prior arts, exemplified in the bronze alloys A and B, was achieved. Moreover, in the bronze alloys C, D, H, K and L with Sn concentration of 12 mass %, the area ratio of the lamellar eutectoid phase α' reached more than 40 area %, which confirmed further improvement in the seizing resistance limit PV value, as shown by the above experimental results.

The invention claimed is:

1. A bronze alloy, consisting of:
   copper;
   tin;
   bismuth;
   nickel; and
   sulfur,
   wherein a content of the tin is 8- 15 mass % relative to a total mass of the bronze alloy,
   a content of the bismuth is 0.5- 7.0 mass % relative to the total mass of the bronze alloy,
   a content of the nickel is 0.5- 5.0 mass % relative to the total mass of the bronze alloy,
   a content of the sulfur is 0.1- 1.0 mass % relative to the total mass of the bronze alloy,
   the nickel and the bismuth inhibit a development of δ-copper and lower a eutectoid transformation temperature through compositional super cooling,
   the sulfur inhibits a diffusion of the tin in the copper and facilitates solidification segregation through lowering of a solubility limit of α-copper in order to cause a large quantity of γ-copper to be transformed from β-copper, and
   a metal structure of the bronze alloy comprises an eutectoid phase including the α-copper having a lamellar structure including a flaky copper-tin intermetallic compound precipitated and metal particles including the bismuth dispersedly precipitated therein, and the α-copper and copper-tin based intermetallic compound in a laminate in a form of pearlite.

2. A bronze alloy consisting of:
   copper;
   tin;
   bismuth;
   nickel;
   sulfur; and
   lead,
   wherein a content of the tin is 8- 15 mass % relative to a total mass of the bronze alloy,
   a content of the bismuth is 0.5- 7.0 mass % relative to the total mass of the bronze alloy.,
   a content of the nickel is 0.5- 5.0 mass % relative to the total mass of the bronze alloy.,
   a content of the sulfur is 0.1- 1.0 mass % relative to the total mass of the bronze alloy, a content of the lead is 4 mass % or lower relative to the total mass of the bronze alloy, the nickel and the bismuth inhibit a development of δ-copper and lower a eutectoid transformation temperature through compositional super cooling, the sulfur inhibits a diffusion of the tin in the copper and facilitates solidification segregation through lowering of a α-copper in order to cause a large quantity of γ-copper to be transformed from β-copper, and a metal structure of the bronze alloy comprises an eutectoid phase including the α-copper having a lamellar structure including a flaky copper-tin intermetallic compound precipitated and metal particles including the bismuth dispersediy precipitated therein, and the α-copper and copper-tin based intermetallic compound in a laminate in a form of pearlite.

3. A sliding member, consisting of:

a sliding surface consisting of a bronze alloy consisting of copper, tin, bismuth, nickel, and sulfur, wherein a content of the tin is 8- 15 mass % relative to a total mass of the bronze alloy, a content of the bismuth is 0.5- 7.0 mass % relative to the total mass of the bronze alloy, a content of the nickel is 0.5- 5.0 mass % relative to the total mass of the bronze alloy, a content of the sulfur is 0.1- 1.0 mass % relative to the total mass of the bronze alloy, the nickel and the bismuth inhibit a development of δ-copper and lower a eutectoid transformation temperature through compositional super cooling, the sulfur inhibits a diffusion of the tin in the copper and facilitates solidification segregation through lowering of a solubility limit of α-copper in order to cause a large quantity of γ-copper to be transformed from β-copper, and a metal structure of the bronze alloy comprises an eutectoid phase including the α-copper having a lamellar structure including a flaky copper-tin intermetallic compound precipitated and metal particles including the bismuth dispersedly precipitated therein, and the α-copper and copper-tin based intermetallic compound in a laminate in a form of pearlite.

* * * * *